S. HANSSON.
TRUCK SIDE FRAME.
APPLICATION FILED OCT. 30, 1914.

1,208,776.

Patented Dec. 19, 1916.
2 SHEETS—SHEET 1.

WITNESSES

INVENTOR

S. HANSSON.
TRUCK SIDE FRAME.
APPLICATION FILED OCT. 30, 1915.
1,208,776.
Patented Dec. 19, 1916.
2 SHEETS—SHEET 2.
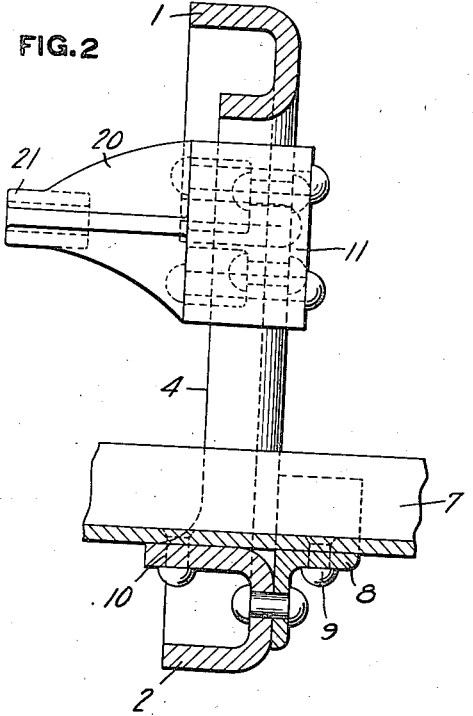
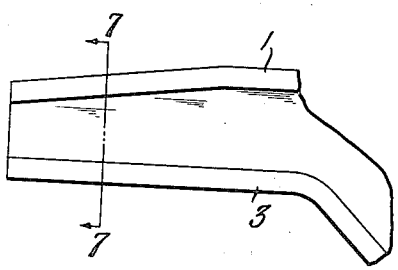
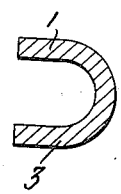
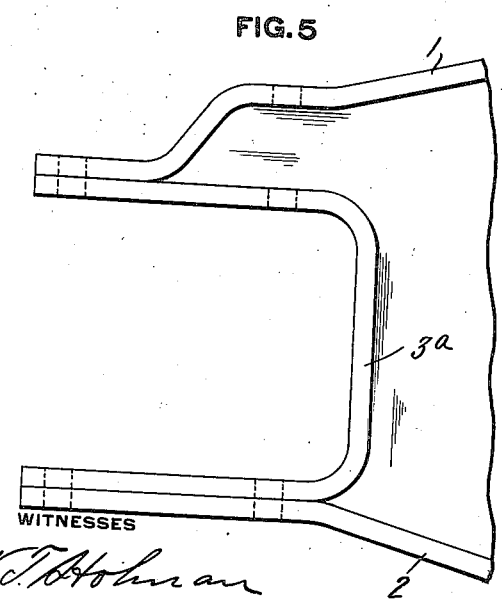
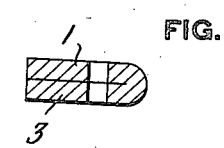
WITNESSES
INVENTOR

UNITED STATES PATENT OFFICE.

SOREN HANSSON, OF NEW GLASGOW, NOVA SCOTIA, CANADA.

TRUCK SIDE FRAME.

1,208,776.  Specification of Letters Patent.  Patented Dec. 19, 1916.

Application filed October 30, 1915. Serial No. 58,932.

*To all whom it may concern:*

Be it known that I, SOREN HANSSON, a resident of New Glasgow, in the Province of Nova Scotia and Dominion of Canada, have invented a new and useful Improvement in Truck Side Frames, of which the following is a specification.

This invention relates to truck side frames for railway cars, and particularly to pressed steel frames.

The object of the invention is to provide an improved truck side frame which has maximum strength and a minimum weight of metal, which can be manufactured by simple operations at low cost upon ordinary machines, and which is reinforced at all of the usual weak points in truck side frames.

A further object of the invention is to provide a truck side frame having a reinforcing and stiffening member below the bolster which also serves as a support for the spring plank.

A further object of the invention is to provide an improved form of column guide for truck side frames which also embodies the usual brake hanger bracket, so that the entire construction is simplified and is cheaper to manufacture.

Further objects of the invention are in part obvious and in part will appear more in detail hereinafter.

Figure 3:
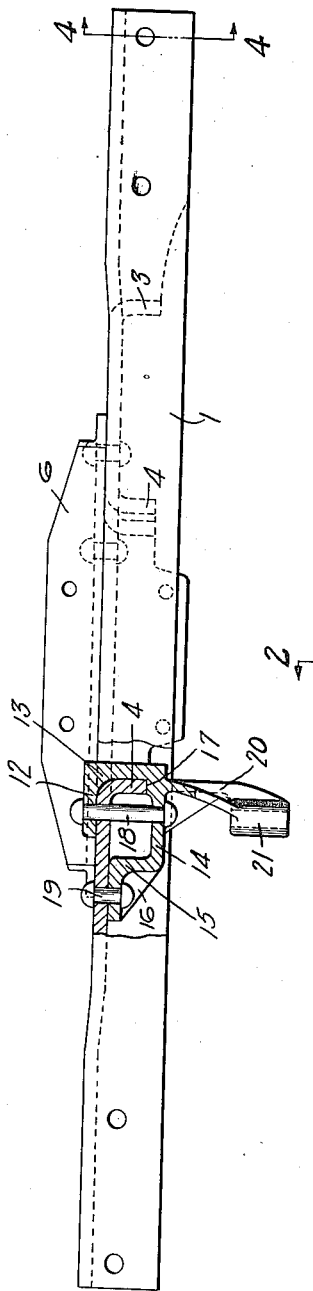
Figure 1:
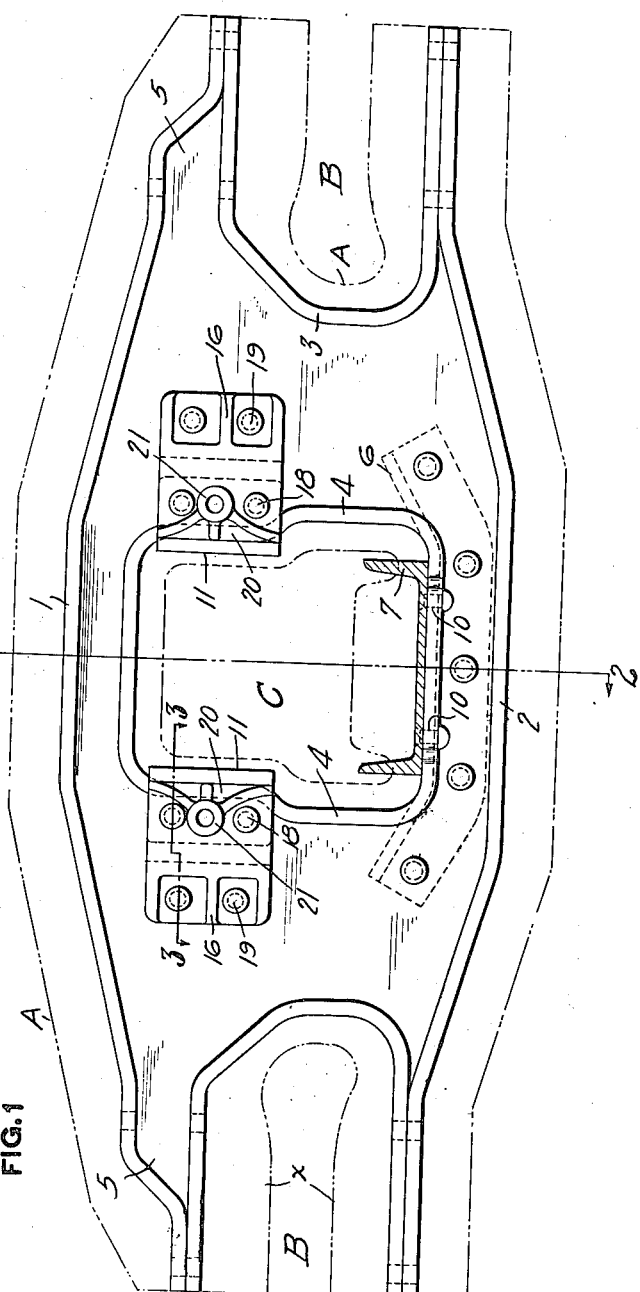

In the drawings, Figure 1 is an inside elevation of a truck side frame embodying the invention, and also illustrating in part the method of manufacture thereof; Fig. 2 is a sectional elevation on the line 2—2, Fig. 1 looking in the direction of the arrows; Fig. 3 is a top view, partly in section on the line 3—3, Fig. 1; Fig. 4 is a cross section on the line 4—4, Fig. 3, looking in the direction of the arrows; Fig. 5 is a detail view, corresponding to Fig. 1 and illustrating a modification; Fig. 6 is a detail view of one end portion of the side frame above the journal box, after flanging and before pressing the same; and Fig. 7 is a cross section on the line 7—7, Fig. 6.

The truck side frame shown in the drawings is made of pressed plate metal by first shearing out a blank to the shape indicated by the dotted lines A. The shearing dies are so formed as to not only produce the proper outline but also form slots or openings B at the ends of the frame for the journal box recesses, and also a central opening C for the bolster. The blank so formed is then subjected to a flanging operation in a suitable press, which produces upper and lower flanges 1 and 2 along the top and bottom of the frame, end flanges 3 around the recesses for the journal boxes, and a flange 4 around the opening for the bolster. All of these flanges can be formed in a single operation. At the ends of the frame, above and below the journal box recesses, the first flanging operation leaves the flanges 1 and 3 above the recess, and the flanges 2 and 3 below the recess, separated from each other, as shown in Figs. 6 and 7, (which illustrate the flanges above the recess) due to the necessity of leaving a space between said flanges for the entrance of the male flanging die. These flanges are then pressed together, to the form shown in Fig. 1, by a squeezing or pressing operation, which not only presses together the flanges 1 and 3, and the flanges 2 and 3, but also widens them out to a greater width than the flanges on the main body portion of the frame, due to some extra metal provided in the initial blank, as at $x$, which gives an increased bearing surface on the journal box, provides sufficient metal for the journal box bolt without weakening the side frame, and also gives a good solid connection between the flanges themselves. Above the journal boxes, where the upper arms at the ends of the side frame join the main body of the frame the flanges 1 and 3 are left separated, the upper flange 1 arching upwardly away from the flange 3 between the two journal box bolts, as indicated at 5. This arrangement materially strengthens or reinforces the side frame and increases the ability of the upper arms of the frame above the journal boxes to resist shearing or bending strains in the vertical plane.

The recesses for the journal boxes may of course be of any suitable shape, and the initial blank may be trimmed and the flanging dies so formed as to cause the flange 3 around the journal box recess to closely hug the journal box, as indicated at 3ª in Fig. 5, or to extend inwardly toward the bolster opening and away from the journal box, as shown in Fig. 1.

Above and below the bolster opening C the flanges 1 and 4 and the flanges 2 and 4 are separated from each other, so as to increase the strength of the frame to shearing or bending stresses in the vertical plane. Below the bolster opening the frame is reinforced by a suitable member 6 riveted to the outer flat face of the frame, and shown as an angle member whose ends are bent upwardly toward the journal box recesses. This stiffening member not only reinforces the frame but also serves as a support for the spring plank 7, which is the usual channel member riveted or bolted to the upper horizontal flange 8 of the angle member 6, as at 9, and also to the flange 4 around the bolster opening C, as at 10.

The column guides are shown as cast metal members of box-like form embracing the flanges along the vertical edges of the bolster opening C. Each column guide has an inner wall 11 having the usual guiding functions and which abuts flange 4 of the bolster opening. Said wall 11 along its outer edge has a flange extension 12 lying on the outer plane face of the frame, the angle between said wall and flange being materially reinforced on its inner corner by thickening up the metal of the casting to substantially conform to the curve of the frame, as at 13. The inner edge of the wall 11 is continuous with the main body portion 14 of the column guide, which is of box-like form having a foot 15 lying against the inner face of the frame and provided with reinforcing ribs 16. The inner surface of the body portion 14, adjacent the wall 11 abuts the edge of the flange 4, as indicated at 17. Consequently the securing rivets or bolts 18 and 19 for the column guide, which pass through the body portion 14, the frame and the flange 12, and the foot 15 and frame, securely clamp the column guide to the frame and make it practically a rigid integral part thereof. The body portion of the column guide is provided with an inwardly extending bracket 20 whose end portion is of hollow tubular form, as shown at 21, and serves as a support for the brake hanger, as will be readily understood. This combined brake hanger bracket and column guide is of simple construction as it can be cast in a single piece and may be very easily secured to the frame so as to be rigid and immovable thereon.

The side frame described is of simple construction and can be made at low cost by simple operations and upon ordinary machines. It is of minimum weight and yet has maximum strength and is thoroughly reinforced in all of the usual weak places of said frames.

What I claim is:—

1. A pressed steel side frame, comprising a plate metal member provided with flanges around its edges, said flanges being pressed together above and below the journal box recesses to increase the bearing surface.

2. A pressed steel side frame, comprising a plate metal member provided with flanges around its edges and at its ends having recesses forming arms to receive the journal boxes, and flanges around the edges of said recesses, the upper and lower flanges of said arms being pressed together and wider than the flanges on the body portion of the frame.

3. A pressed steel side frame, comprising a plate metal member provided with flanges around its edges and at its ends having recesses forming arms to receive the journal boxes, and flanges around the edges of said recesses, the upper and lower flanges of said arms being pressed together and wider than the flanges on the body portion of the frame, the upper and lower flanges of the upper arm where it merges into the main body of the frame being separated from each other to reinforce said arm in the vertical plane.

4. A pressed steel side frame, comprising a plate metal member provided with a central opening for the bolster and end recesses for the journal boxes, and flanges around the outer edges of said member and around the edges of said opening and recesses, said flanges above the journal boxes being pressed together and wider than the other flanges to increase the bearing surface.

5. A pressed steel side frame, comprising a plate metal member provided with a central opening for the bolster and end recesses for the journal boxes, and flanges around the outer edges of said member and around the edges of said opening and recesses, said flanges above and below the journal boxes being pressed together and wider than the other flanges to increase the bearing surface.

6. A pressed steel side frame, comprising a plate metal member having an opening for the bolster and provided with flanges around its outer edges and around the edges of said opening, and a reinforcing member secured to the plate metal body of said frame below the bolster opening.

7. A pressed steel side frame, comprising a plate metal member having an opening for the bolster and provided with flanges around its outer edges and around the edges of said opening, and a reinforcing member secured to the plate metal body of said frame below the bolster opening and having its ends bent upwardly toward the ends of the frame.

8. A pressed steel side frame, comprising a plate metal member having a central opening for the bolster and provided with flanges around its outer edges and around the edges of said opening, and a reinforcing angle member secured to said frame below the bolster opening and thereby reinforcing the frame in a vertical plane and also serving as a support for the spring plank.

In testimony whereof, I have hereunto set my hand.

SOREN HANSSON.

Witnesses:
A. MacDonald,
W. E. Norton.